United States Patent [19]
Gotan

[11] Patent Number: 5,922,788
[45] Date of Patent: Jul. 13, 1999

[54] SURFACE COATING AGENT

[76] Inventor: Kaneo Gotan, 1-207, Nayamacho 3-chome, Shimonoseki-shi, Yamaguchi, Japan

[21] Appl. No.: 08/863,940

[22] Filed: Feb. 6, 1997

Related U.S. Application Data

[63] Continuation-in-part of application No. 08/538,610, Oct. 3, 1995, abandoned.

[51] Int. Cl.[6] .................................. C08K 5/09; C08K 5/16
[52] U.S. Cl. ............................. 524/5; 524/492; 524/495; 524/462; 524/463; 524/522; 524/556
[58] Field of Search ................................ 524/5, 492, 495, 524/462, 463, 522, 556

[56] References Cited

U.S. PATENT DOCUMENTS

| | | | |
|---|---|---|---|
| 4,529,765 | 7/1985 | DenHartog et al. | 524/294 |
| 4,846,889 | 7/1989 | Meyer | 106/115 |
| 4,968,734 | 11/1990 | Gaidis et al. | 524/5 |
| 5,030,282 | 7/1991 | Matsuhashi et al. | 524/5 |
| 5,308,891 | 5/1994 | Shinozaki | 524/5 |

FOREIGN PATENT DOCUMENTS

| | | | |
|---|---|---|---|
| 2237808 | 5/1991 | United Kingdom | 524/5 |

*Primary Examiner*—James J. Seidleck
*Assistant Examiner*—Olga Asinovsky

[57] ABSTRACT

A surface coating agent includes a main ingredient compound containing a mixture of white cement and finely ground silica and carbon fibers and a water soluble hardener containing a mixture of a cationic acrylic resin and an anionic acrylic resin.

4 Claims, No Drawings

SURFACE COATING AGENT

CROSS REFERENCES TO RELATED APPLICATIONS

This is a continuation-in-part application of Ser. No. 538,610 filed Oct. 3, 1995, abandoned.

BACKGROUND OF THE INVENTION

1. Field of the Invention

The present invention relates to surface coating agents.

2. Description of the Prior Art

Conventional undercoats such as rust inhibitors tend to peel off so soon that it has been practice to coat them in several layers. In order to reduce the number of coatings, to increase the adhesive or weather resistant properties, and to prevent the peeling off by expanding or shrinking along with the ground changes, Japanese patent publication 7-42153 has proposed a surface coating agent which comprises a compound of carbon fibers added to a mixture of white cement and finely ground silica and a water soluble hardener including a mixture of cationic styrenebutadien copolymer and methacrylic cyclohexyl copolymer.

However, in the conventional surface coating agent, the water soluble hardener emulsion is a mixture of the cationic styrenebutadien copolymer and the methacrylic cyclohexyl copolymer so that the emulsion is unstable. Consequently, the surface coating agent containing the water soluble hardener has poor leveling property, forming uneven coatings.

SUMMARY OF THE INVENTION

Accordingly, it is an object of the invention to provide a surface coating agent having good leveling property and requiring fewer coatings than before.

According to one aspect of the invention there is provided a surface coating agent comprising a compound consisting of a mixture of white cement and finely ground silica and carbon fibers and a water soluble hardener containing a mixture of a cationic acrylic resin and an anionic acrylic resin.

According to another aspect of the invention there is provided a surface coating agent wherein the water soluble hardener contains an anticoagulant.

The above and other objects, features, and advantages of the invention will be more apparent from the following description when taken in conjunction with the accompanying drawings.

DESCRIPTION OF THE PREFERRED EMBODIMENT

The surface coating agent according to an embodiment of the invention contains a compound and a water soluble hardener.

The compound is made by adding carbon fibers to a main ingredient or mixture of white cement and finely ground silica.

The water soluble hardener is an emulsion made by mixing water emulsions of a cationic acrylic resin and an anionic acrylic resin.

Examples of the anionic resin include polymers of acrylates or methacrylates and copolymers of acrylates or methacrylates and other components such as alpha-olefin, vinyl esters, or halogenated vinyl compounds. Preferred examples of the cationic acrylic resin include amine denatured polyacrylates while preferred examples of the anionic acrylic resin include carboxyl denatured polyacrylates.

The cationic acrylic resins have a positive charge so that they have high adhesive power to the ground material which has a negative charge. The anionic acrylic resin with negative charge is mixed with the water soluble emulsion of cationic acrylic resin to stabilize the emulsion. The amount of the anionic acrylic resin mixed with the emulsion should be small because large amounts of the resin cause gelation.

The stabilized emulsion improves the leveling property of the surface coating agent which contains the water soluble hardener.

Small amounts of anticoagulant such as nonion surfactant added to the water soluble hardener help to prevent the gelation. Other additives such as deodorants and antifoaming agents may be added to the water soluble hardener.

The surface coating agent thus made is applied by means of brushes, rollers, knives, or sprays. On application, the surface coating agent is prepared as follows. A quantity of the water soluble hardener is put in a container and stirred by a hand mixer while the compound is gradually added. As undercoats, one part of the water soluble hardener (emulsion) and two to three parts of the compound are mixed. For other applications, the mixing ratio varies according to the application conditions and purposes. For applications by knives, for example, one part of the water soluble hardener (emulsion) and three to five parts of the compound are appropriate. Where the surface coating agent becomes hard after preparation, it is possible to recover by adding the water soluble hardener.

The white cement in the surface coating agent contains mainly calcium oxide, silica, and/or alumina. The silanol groups of the finely ground silica enhance the dispersion, adherence, and anticorrosive power of the main ingredient, facilitate the mixture of preparation, and improve the adhesion to the ground material. The carbon fibers help to prevent cracks or dripping of the coating agent. The carbon fibers are distributed evenly in the compound by the finely ground silica and hardened along with the other compound elements by the water soluble hardener.

The preferred composition of the compound is 30–40% by volume of white cement, 46–58% by volume of quartz sand (finely ground silica), and 2–5% by volume of carbon fibers. This composition may be changed according to the kind of ground materials and the circumstantial conditions.

The drying time of the surface coating agent applied to a ground material depends on the thickness of coating and the field conditions such as temperature. For example, it is 10–60 minutes for the summer and 60–120 minutes for the winter where it is coated by brush to a thickness of 0.5 mm.

As few as two coats of the surface coating agent is enough to prevent corrosion or rusting on iron grounds. Consequently, small amounts of work can make huge structures such as bridges corrosion and rust proof. The high leveling property in application provides smooth finish surfaces. For use as adhesives between materials, only three coatings are necessary. The surface coating agent applied to a ground material increases the adhesive power. For concrete work, the water soluble hardener is impregnated into the ground material, and then the surface coating agent is applied. Cloth impregnated with the surface coating agent or the surface coating agent alone can be applied to reinforce floor panels, etc.

The addition of fluororesin to the above surface coating agent not only improves the weather resistance but also prevents the production of pinholes in the coatings.

Examples of the fluororesin are polytetrafluoroethylene (PTFE), polychlorotrifluoroethylene (PCTFE), polyviniliden fluoride (PVDF), polyvynyl floride (PVF), and tetrafluoroethlene-hexafluoropropylene (FEO). The added octylphenoxypolyethoxy alcohol cooperates with the water soluble hardener to improve the distribution of carbon fibers, thereby minimizing the cracks and dripping of the coatings. The respective amounts of a fluororesin and an octylphenoxyl polyethoxy alcohol used range from a few percent to tens percent by volume of the surface coating agent depending on the uses or purposes.

As has been described above, according to one aspect of the invention, the water soluble hardener contains a mixture of cationic and anionic acrylic resins so that the emulsion is stabilized, with the result that the surface coating agent containing the water soluble hardener and the compound has high leveling property in application, thus providing smooth finish surfaces. A small amount of a mixture of anionic acrylic resin is added to the water soluble emulsion to prevent the gelation so that a large proportion of cationic acrylic resin is contained in the water soluble hardener, thus providing high adhesive power to the ground materials and reducing the number of coatings.

According to another aspect of the invention the anticoagulant added to the water soluble agent helps to prevent the gelation of the hardener emulsion.

What is claimed is:

1. A surface coating agent comprising:

a compound containing a mixture of 30–40% by volume of white cement, 46–58% by volume of finely ground silica, and 2–5% by volume of carbon fibers and a water soluble hardener containing a mixture of an amine denatured polyacrylate and a carboxyl denatured polyacrylate.

2. A surface coating agent according to claim 1, wherein one part of said water soluble hardener and two to three parts of said compound are mixed as an undercoat.

3. A surface coating agent according to claim 1, wherein one part of the water soluble hardener and three to five parts of said compound are mixed for application by knives.

4. A surface coating agent comprising:

a compound containing a mixture of white cement, finely ground silica, and carbon fibers;

a water soluble hardener containing a mixture of a cationic acrylic resin and an anionic acrylic resin;

an octylphenoxypolyethoxy alcohol; and a fluororesin.

* * * * *